US006919801B2

(12) United States Patent
Kim

(10) Patent No.: US 6,919,801 B2
(45) Date of Patent: Jul. 19, 2005

(54) VEHICLE SAFETY SYSTEM FOR PREVENTING INADVERTENT ACCELERATION OF A VEHICLE

(76) Inventor: Jae Yeal Kim, 699 Rembrandt Cir., Corona, CA (US) 92882

( * ) Notice: Subject to any disclaimer, the term of this patent is extended or adjusted under 35 U.S.C. 154(b) by 112 days.

(21) Appl. No.: 10/679,597

(22) Filed: Oct. 6, 2003

(65) Prior Publication Data

US 2005/0075777 A1 Apr. 7, 2005

(51) Int. Cl.$^7$ ................................................ B60Q 1/44
(52) U.S. Cl. ........................ 340/479; 180/282; 180/283
(58) Field of Search ................................ 340/467, 463, 340/464, 479; 180/271, 282, 283, 284, 285

(56) References Cited

U.S. PATENT DOCUMENTS

| | | | | |
|---|---|---|---|---|
| 4,771,849 A | * | 9/1988 | Leiber et al. ................ | 180/197 |
| 4,856,613 A | * | 8/1989 | Reginold ..................... | 180/282 |
| 4,901,055 A | * | 2/1990 | Rosenberg et al. .......... | 340/467 |
| 5,387,898 A | * | 2/1995 | Yeheskel et al. ............. | 340/479 |
| 5,389,824 A | * | 2/1995 | Moroto et al. .............. | 307/10.1 |
| 6,147,600 A | * | 11/2000 | Faye ........................... | 340/467 |
| 6,155,385 A | * | 12/2000 | Basnett ....................... | 188/72.7 |
| 6,559,762 B1 | * | 5/2003 | Tarabishy et al. ............ | 340/435 |

* cited by examiner

*Primary Examiner*—John Tweel, Jr.
(74) *Attorney, Agent, or Firm*—Park & Sutton LLP; John K. Park

(57) ABSTRACT

A vehicle safety system for preventing inadvertent acceleration of a vehicle by a driver is provided. The vehicle includes an engine that supplies power to move the vehicle, a transmission that transmits power from the engine to wheels of the vehicle, an acceleration module that controls the engine to increase power, and a brake module that slows down or stops the vehicle. The acceleration module includes an accelerator pedal that receives pressure applied by the driver, and the brake module includes a brake pedal that receives pressure applied by the driver. The system includes a pressure sensor that senses pressure applied to the accelerator pedal, and a control circuit that is connected to the pressure sensor and the vehicle. The control circuit is activated to prevent inadvertent acceleration of the vehicle when the pressure sensed by the pressure sensor exceeds a predetermined safety threshold.

19 Claims, 4 Drawing Sheets

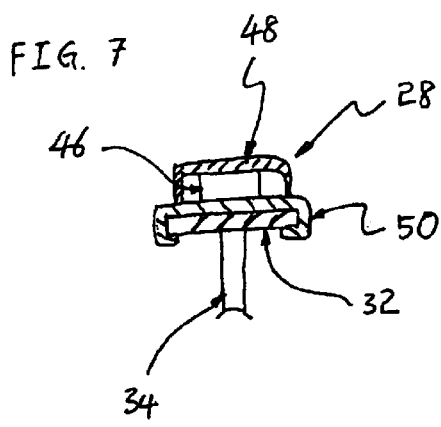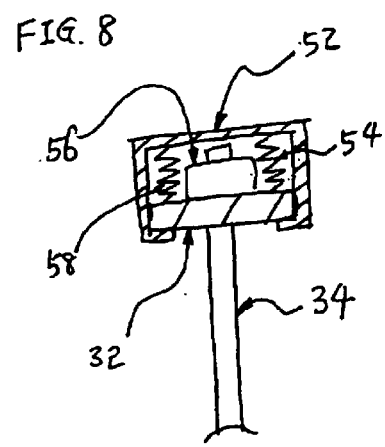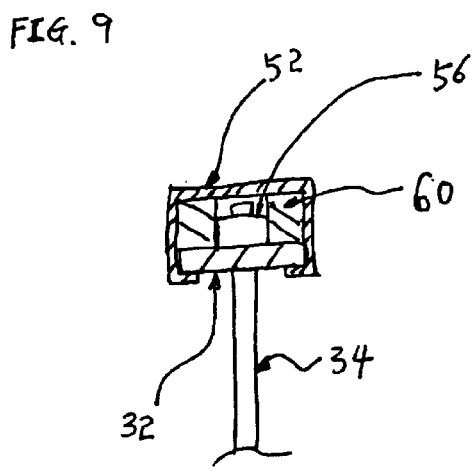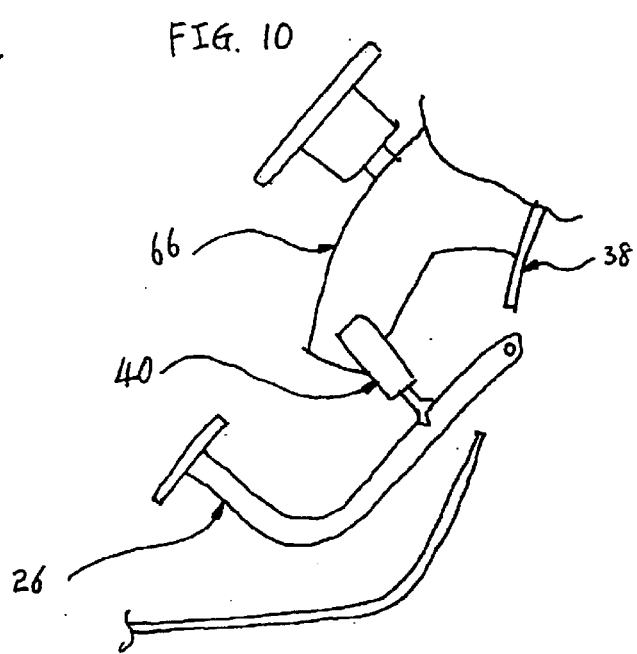

VEHICLE SAFETY SYSTEM FOR PREVENTING INADVERTENT ACCELERATION OF A VEHICLE

BACKGROUND OF THE INVENTION

The present invention relates to a vehicle safety system that prevents inadvertent acceleration of a vehicle. More particularly, this invention relates to a vehicle safety system that disables moving operation of the vehicle when an erroneous pressing of the accelerator pedal is sensed.

Many accidents have occurred when a driver of a vehicle mistook the accelerator pedal for a brake pedal. Such a mistake not only occurs for novice drivers or physically weak people, but also occurs for skilled drivers when they suffer distractions by various causes. Tragic results occurred when the driver, overwhelmed by panic, could not realize that he or she had mistaken, and kept pressing the accelerator pedal harder.

A safety mechanism that can handle such human errors, while not impairing normal maneuverability of vehicles, has long been in need.

SUMMARY OF THE INVENTION

The present invention contrives to solve the need that was not addressed by the prior art.

An objective of the invention is to provide a vehicle safety system that can prevent inadvertent acceleration of a vehicle.

Another objective of the invention is to provide a vehicle system that controls movement of the vehicle when a driver mistakenly handles vehicle pedals.

Still another objective of the invention is to provide a simple and reliable vehicle safety system.

To achieve the above objectives, a vehicle safety system for preventing inadvertent acceleration of a vehicle by a driver is provided. The vehicle includes an engine that supplies power to move the vehicle, a transmission that transmits power from the engine to wheels of the vehicle, an acceleration module that controls the engine to increase power, and a brake module that slows down or stops the vehicle. The acceleration module includes an accelerator pedal that receives pressure applied by the driver, and the brake module includes a brake pedal that receives pressure applied by the driver. The vehicle safety system includes a pressure sensor that senses pressure applied to the accelerator pedal, and a control circuit that is connected to the pressure sensor and the vehicle. The control circuit is activated to prevent inadvertent acceleration of the vehicle when the pressure sensed by the pressure sensor exceeds a predetermined safety threshold.

The invention utilizes the fact that the pressure specified for proper operation of the brake pedal is different from the pressure specified for proper operation of the accelerator pedal. If the driver mistakes the accelerator pedal for the brake pedal and presses the accelerator pedal instead of the brake pedal for the intention of braking the vehicle, since the pressure for brake pedal is larger than the pressure for the accelerator pedal, the control circuit judges that the driver pressed the wrong pedal, and take measures for decelerating or stopping the vehicle.

The pressure sensor is provided on the accelerator pedal so that the pressure sensor directly receives pressure from the driver. Alternately, the pressure sensor is provided between the accelerator pedal and a body wall of the vehicle under the accelerator pedal. Alternately, the pressure sensor is provided near a hinge point of the vehicle, at which the accelerator pedal is pivotally attached.

When the pressure sensed by the pressure sensor exceeds the safety threshold, the control circuit deactivates the acceleration module by setting the engine in an idling state.

Alternately, the control circuit activates the brake module so that the vehicle is decelerated. An actuator may be provided to pivot the brake pedal via a cable.

Alternately, the control circuit sets the transmission so that the transmission does not transmit power from the engine.

The control circuit creates a warning signal when the pressure sensed by the pressure sensor falls in a range between a predetermined warning threshold and the safety threshold. The warning threshold is less than the safety threshold value. The control circuit creates an emergency signal when the pressure sensed by the pressure sensor exceeds the safety threshold.

For safety in normal speed driving situations, the control circuit may be set to be activated only when the speed of the vehicle is less than a predetermined speed value.

Once the control circuit is activated, the control circuit sets and keeps the acceleration module disabled, even though the pressure over the safety threshold on the accelerator pedal disappears.

For a special purpose like racing, the control circuit may be kept from being activated by manual overriding.

The pressure sensor includes a load cell. Alternately, the pressure sensor includes a pressure receiving plate, an elastic member that supports the pressure receiving plate, and a displacement switch that is operated when the pressure receiving plate is pushed more than a predetermined distance overcoming the force applied by the elastic member. The elastic member is made of a compression spring or foam that has constant elasticity.

The advantages of the present invention are: (1) a system for preventing inadvertent acceleration of a vehicle is provided; (2) the system can be installed at various points in a vehicle; (3) the system provides various ways to prevent inadvertent acceleration by controlling the vehicle's essential functions; (4) the system is simple and reliable; (5) the system does not interfere with normal driving of the vehicle; (6) the system has warning features that reminds the driver's error.

Although the present invention is briefly summarized, the fuller understanding of the invention can be obtained by the following drawings, detailed description and appended claims.

DESCRIPTION OF THE FIGURES

These and other features, aspects and advantages of the present invention will become better understood with reference to the accompanying drawings, wherein:

FIG. 7 is a schematic cross-sectional view of the pressure sensor with a load cell;

FIG. 8 is a schematic cross-sectional view of the pressure sensor with springs;

FIG. 9 is a schematic cross-sectional view of the pressure sensor with foam elastic member; and FIG. 10 is a view similar to FIG. 6 showing the actuator is installed to a different location.

DETAILED DESCRIPTION OF THE INVENTION

Figure 1:
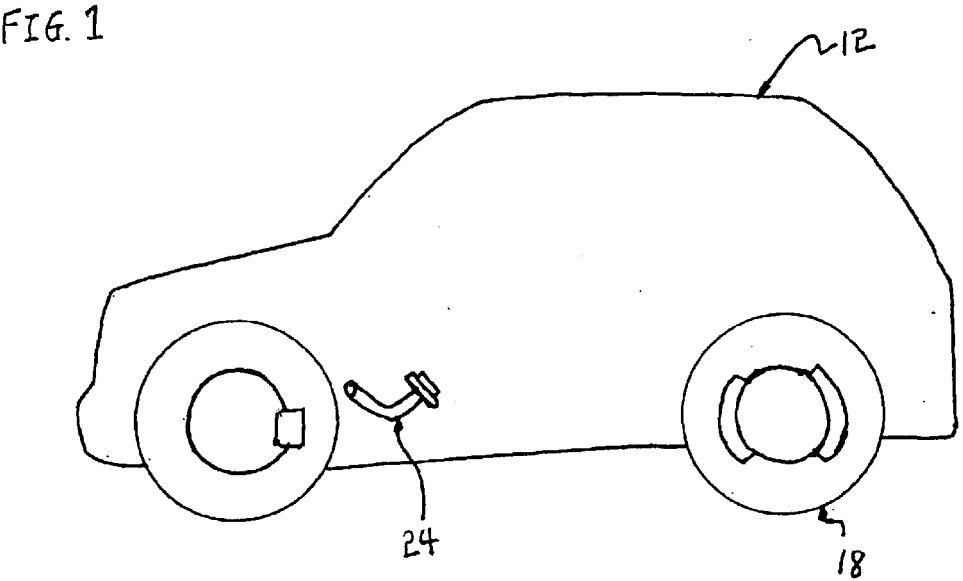
FIG. 1 is a schematic elevation view of a vehicle in which a vehicle safety system according to the present invention is used.
Figure 2:
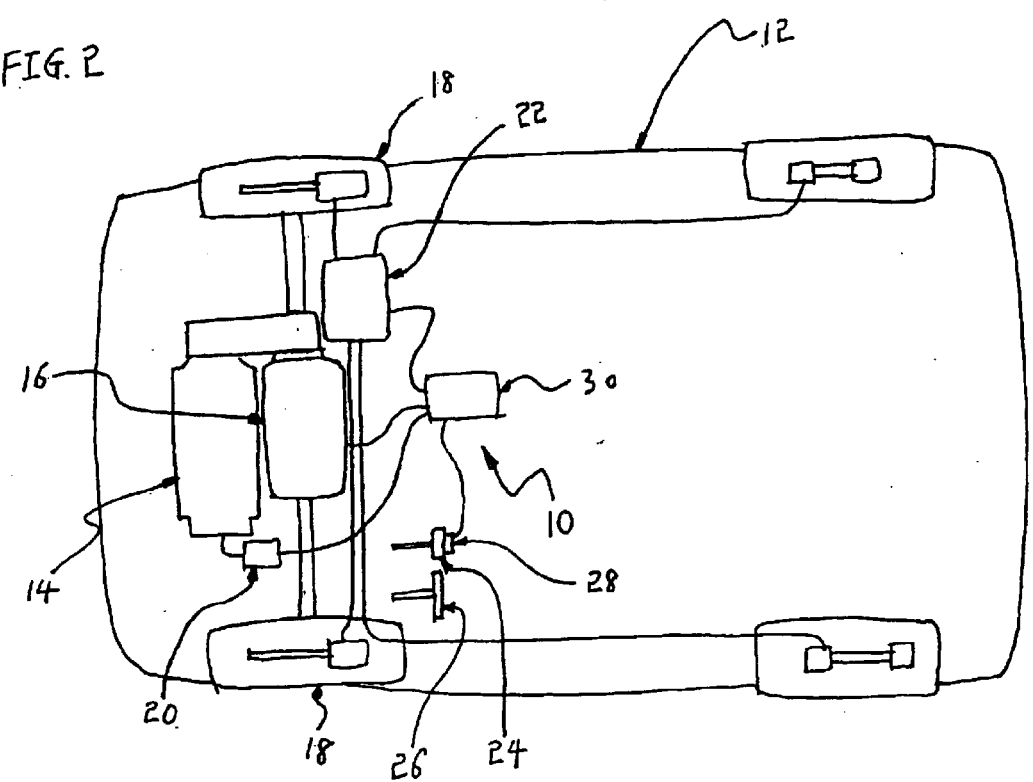
FIG. 2 is a schematic plan view of the vehicle.

FIGS. 1 and 2 show a vehicle safety system 10 for preventing inadvertent acceleration of a vehicle 12 by a driver. The vehicle 12 includes an engine 14 that supplies power to move the vehicle 12, a transmission 16 that transmits power from the engine 14 to wheels 18 of the vehicle 12, an acceleration module 20 that controls the engine 14 to increase power, and a brake module 22 that slows down or stops the vehicle 12. The acceleration module 20 includes an accelerator pedal 24 that receives pressure applied by the driver, and the brake module 22 includes a brake pedal 26 that receives pressure applied by the driver. The vehicle safety system 10 includes a pressure sensor 28 that senses pressure applied to the accelerator pedal 24, and a control circuit 30 that is connected to the pressure sensor 28 and the vehicle 12. The control circuit 30 is activated to prevent inadvertent acceleration of the vehicle 12 when the pressure sensed by the pressure sensor 28 exceeds a predetermined safety threshold.

For most vehicles, the pressure specified for proper operation of the brake pedal 26 is different from the pressure specified for proper operation of the accelerator pedal 24. The safety threshold is determined to utilize this difference. If the driver mistakes the accelerator pedal 24 for the brake pedal 26 and presses the accelerator pedal 24 instead of brake pedal 26 for the intention of braking the vehicle 12, the pressure sensor 28 senses pressure that is greater than the safety threshold, the control circuit 30 judges that the driver pressed the wrong pedal, and takes measures for decelerating or stopping the vehicle 12.

Figure 3:
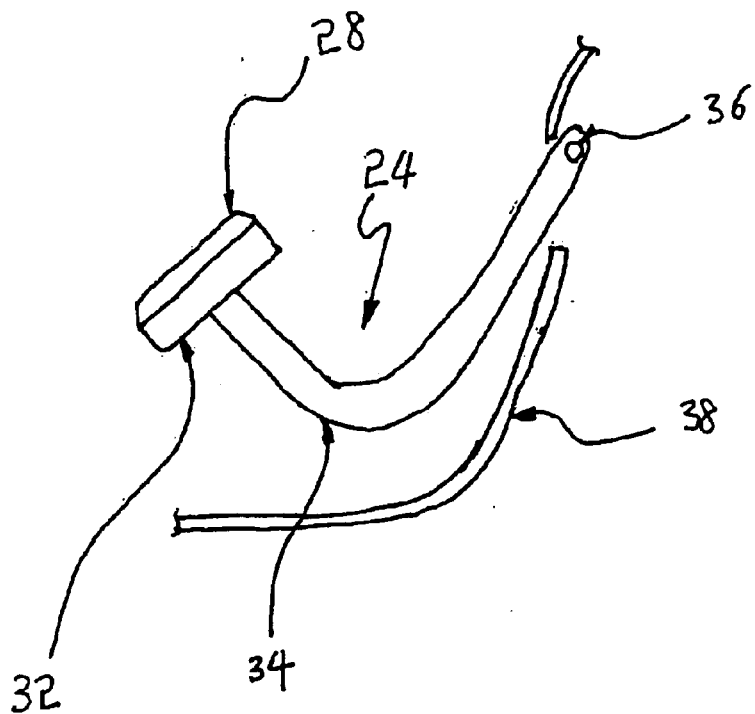
FIG. 3 is a schematic elevation view showing a pressure sensor attached on an accelerator pedal.

FIG. 3 shows that the pressure sensor 28 is provided on the accelerator pedal 24 so that the pressure sensor 28 directly receives pressure from the driver. Specifically, the accelerator pedal 24 includes an accelerator pedal plate 32, and an accelerator pedal lever 34. One end of the accelerator pedal lever 34 is fixed to the accelerator pedal plate 32, and the other end is pivotally supported at a hinge point 36 provided in the vehicle 12. The accelerator pedal 24 is installed at a certain distance from a body wall 38 of the vehicle 12. The pressure sensor 28 is attached on the accelerator pedal plate 32, so that the driver's foot directly presses the pressure sensor 28.

Figure 4:
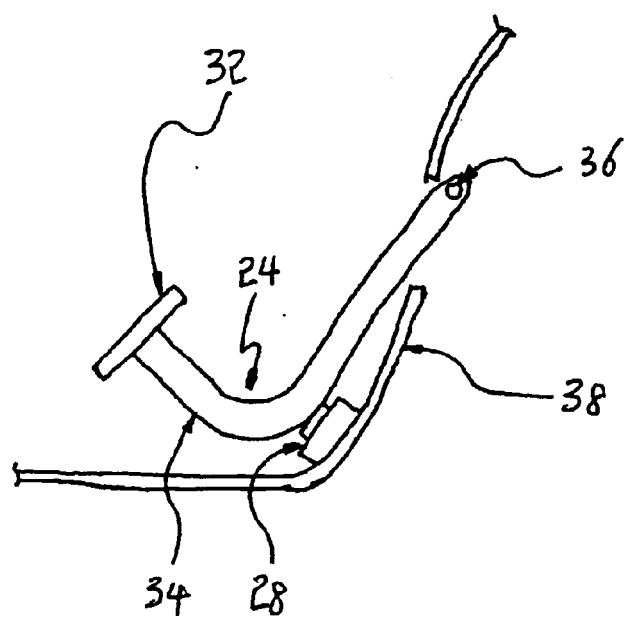
FIG. 4 is a schematic elevation view showing that the pressure sensor is installed between the accelerator pedal and a wall of the vehicle under the accelerator pedal.

FIG. 4 shows that the pressure sensor 28 is provided between the accelerator pedal 24 and the body wall 38. When the accelerator pedal 24 is pivoted downward, the accelerator pedal lever 34 contacts the pressure sensor 28, and transfers the pressure applied by the driver to the pressure sensor 28.

Figure 5:
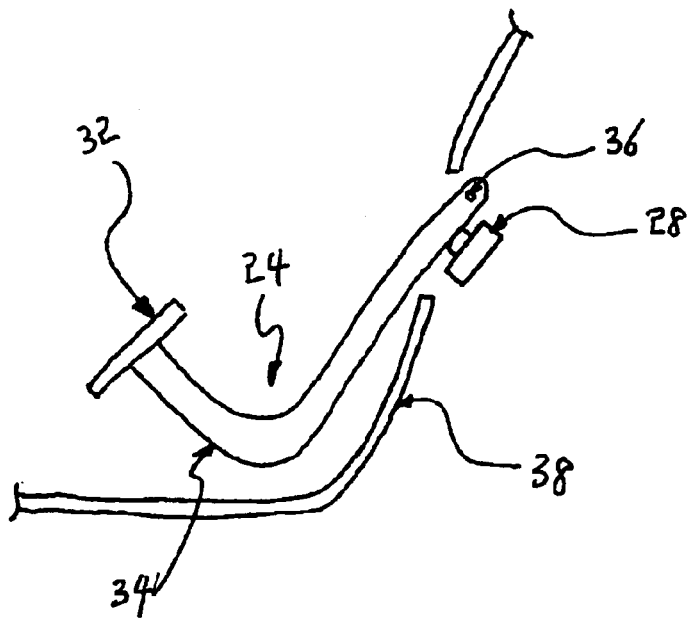
FIG. 5 is a schematic elevation view showing that the pressure sensor is installed near a hinge point of the accelerator pedal.

FIG. 5 shows that the pressure sensor 28 is provided near the hinge point 36 of the accelerator pedal 24.

Referring back to FIG. 2, when the control circuit 30 is activated by sensing abnormal pressure on the accelerator pedal 24, the control circuit 30 deactivates the acceleration module 20. Specifically, the control circuit 30 sets the engine 14 in idling state as if the accelerator pedal 24 was not pressed.

Alternately, the control circuit 30 activates the brake module 22 so that the vehicle 12 is decelerated to slow down or stop.

Alternately, the control circuit 30 sets the transmission 16 so that the transmission 16 does not transmit power from the engine 14. That is, the transmission 16 is set to the neutral state.

The above-explained actions of the control circuit 30 may be combined at the same time to further ensure safety when the vehicle 12 is mistakenly driven.

Nowadays, a microcomputer controls the functionality of the vehicle 12. The functionalities of the vehicle such as braking and engine power output control are performed with the microcomputer. The control circuit 30 may provide data or signals to the microcomputer to perform the actions for vehicle driving safety.

As precautionary measures, the control circuit 30 creates a warning signal when the pressure sensed by the pressure sensor 28 falls in a range between a predetermined warning threshold and the safety threshold. The warning threshold is less than the safety threshold value. The control circuit 30 creates an emergency signal when the pressure sensed by the pressure sensor 28 exceeds the safety threshold.

Most accidents due to mistaking pedals occur in a parking lot, or a very crowded street, where a driver should start the vehicle from a stopped state or a very slowly moving state. Also, activation of the control circuit 30 may be dangerous when the vehicle 12 is moving in a high speed such as in highway driving. To handle these situations, the control circuit 30 may be set to be activated only when the speed of the vehicle 12 is less than a predetermined speed value. Preferably, the predetermined speed value is 20 miles per hour.

To help the driver get out of a panic situation, and to further enhance safety, once the control circuit 30 is activated, the control circuit 30 sets and keeps the acceleration module 20 disabled. The acceleration module 20 may be enabled after a predetermined time lapses after an erroneous pressing of the accelerator pedal 24 is occurred.

For special purposes such as racing, the control circuit 30 may be kept from being activated by manual overriding.

Figure 6:
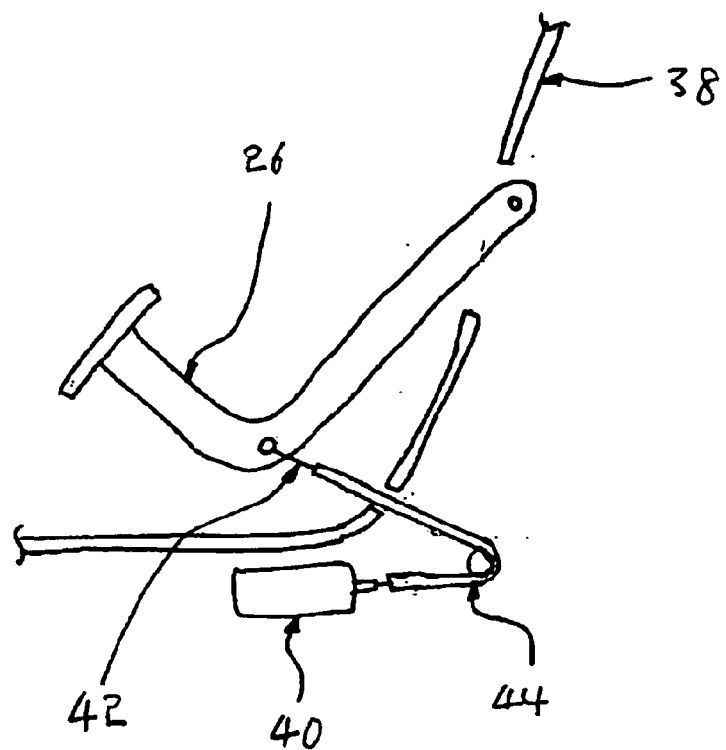
FIG. 6 is a schematic elevation view showing an actuator that pivots a brake pedal when the vehicle safety system is activated.

FIG. 6 shows an actuator 40 that pivots the brake pedal 26 when the brake module 22 is activated by the control circuit 30. The actuator 40 may be electrically, pneumatically, or hydraulically operated. The actuator 40 pivots the brake pedal 26 via a cable 42. The cable 42 is routed by a tube 44 that guides the cable 42. In this way, the actuator 40 may be positioned conveniently within the vehicle 12. Alternately, FIG. 10 shows that the actuator 40 is installed to a different location, the steering column 66 of the vehicle 12. The actuator 40 pushes the brake pedal 26 to pivot the brake pedal 26 downward when the brake module 22 is activated by the control circuit 30.

FIG. 7 shows the pressure sensor 28 includes a load cell 46. The load cell 46 measures the pressure applied by the driver to the accelerator pedal 24, and sends the measured value 46 to the control circuit 30 to decide whether the pressure is above the safety threshold. The load cell 46 is covered with a cover 48, and the pressure sensor 28 is attached to the accelerator pedal plate 32 with a plastic or rubber bracket 50.

Alternately, as shown in FIGS. 8 and 9, the pressure sensor 28 includes a pressure receiving plate 52, an elastic member 54 that supports the pressure receiving plate 52, a displacement switch 56 that is operated when the pressure receiving plate 52 is pushed more than a predetermined distance overcoming the force applied by the elastic member 54.

The elastic member 54 includes one or more compression springs 58 as shown in FIG. 8, or foam 60 that has constant elasticity as shown in FIG. 9.

With the above construction, a simple and reliable vehicle safety system for preventing inadvertent acceleration of a vehicle is provided. The system can be easily installed within an existing vehicle and the system is in harmony with normal driving functionality of a vehicle.

While the invention has been shown and described with reference to different embodiments thereof, it will be appreciated by those skilled in the art that variations in form, detail, compositions and operation may be made without departing from the spirit and scope of the invention as defined by the accompanying claims. The safety system of the present invention may be used for any type of vehicle, which includes cars, trucks, and construction equipments, etc., or other machines in which brake pedal and accelerator pedal are used to control movement of the vehicle or the machine.

What is claimed is:

1. A vehicle safety system for preventing inadvertent acceleration of a vehicle by a driver, wherein the vehicle comprises an engine that supplies power to move the vehicle, a transmission that transmits power from the engine to wheels of the vehicle, an acceleration module that controls the engine to increase power, and a brake module that slows down or stops the vehicle, wherein the acceleration module comprises an accelerator pedal that receives pressure applied by the driver, and the brake module comprises a brake pedal that receives pressure applied by the driver, the system comprising:
   a) a pressure sensor that senses pressure applied to the accelerator pedal; and
   b) a control circuit that is connected to the pressure sensor and the vehicle;
wherein the control circuit is activated to prevent inadvertent acceleration of the vehicle when the pressure sensed by the pressure sensor exceeds a predetermined safety threshold.

2. The vehicle safety system of claim 1, wherein the pressure sensor is provided on the accelerator pedal so that the pressure sensor directly receives pressure from the driver.

3. The vehicle safety system of claim 1, wherein the pressure sensor is provided between the accelerator pedal and a body wall of the vehicle under the accelerator pedal.

4. The vehicle safety system of claim 1, wherein the pressure sensor is provided near a hinge point of the vehicle, wherein the accelerator pedal is pivotally attached at the hinge point.

5. The vehicle safety system of claim 1, wherein the pressure sensor comprises a pressure receiving plate, an elastic member that supports the pressure receiving plate, a displacement switch that is operated when the pressure receiving plate pushed more than a predetermined distance overcoming the force applied by the elastic member.

6. The vehicle safety system of claim 5, wherein the elastic member comprises a compression spring or foam.

7. The vehicle safety system of claim 1, wherein the control circuit deactivates the acceleration module when the control circuit is activated.

8. The vehicle safety system of claim 7, wherein the control circuit sets the engine in idling state.

9. The vehicle safety system of claim 7, wherein the control circuit activates the brake module so that the vehicle is decelerated.

10. The vehicle safety system of claim 1, wherein the control circuit sets the transmission so that the transmission does not transmit power from the engine, when the control circuit is activated.

11. The vehicle safety system of claim 1, wherein the control circuit activates the brake module when the control circuit is activated.

12. The vehicle safety system of claim 11, further comprising an actuator that pivots the brake pedal when the brake module is activated by the control circuit.

13. The vehicle safety system of claim 12, wherein the actuator pivots the brake pedal via a cable.

14. The vehicle safety system of claim 1, wherein the control circuit creates a warning signal when the pressure sensed by the pressure sensor falls in a range between a predetermined warning threshold and the safety threshold, wherein the warning threshold is less than the safety threshold value.

15. The vehicle safety system of claim 1, wherein the control circuit creates an emergency signal when the pressure sensed by the pressure sensor exceeds the safety threshold.

16. The vehicle safety system of claim 1, wherein the control circuit may be activated when the speed of the vehicle is less than a predetermined speed value.

17. The vehicle safety system of claim 1, wherein once the control circuit is activated, the control circuit sets and keeps the acceleration module disabled.

18. The vehicle safety system of claim 1, wherein the pressure sensor comprises a load cell.

19. The vehicle safety system of claim 1, wherein the control circuit may be kept from being activated by manual overriding.

* * * * *